United States Patent [19]
Baiera et al.

[11] Patent Number: 5,809,938
[45] Date of Patent: Sep. 22, 1998

[54] PET TOY

[75] Inventors: Vincent A. Baiera, Brooklyn, N.Y.;
Jonathan Willinger, Tenafly, N.J.

[73] Assignee: J.W. Pet Company, Inc., Englewood, N.J.

[21] Appl. No.: 816,788

[22] Filed: Mar. 17, 1997

[51] Int. Cl.⁶ .................................................. A01K 29/00
[52] U.S. Cl. ........................................... 119/707; 446/170
[58] Field of Search .................................. 119/702, 706, 119/707; 446/170, 431

[56] References Cited

U.S. PATENT DOCUMENTS

| 4,356,915 | 11/1982 | Phillips | 446/170 X |
| 4,593,911 | 6/1986 | Cory | 446/170 X |
| 5,517,948 | 5/1996 | Udelle et al. | 119/707 X |

*Primary Examiner*—Robert P. Swiatek
*Attorney, Agent, or Firm*—Helfgott & Karas, P.C.

[57] ABSTRACT

A large hollow ball is centrally and symmetrically mounted around an axle having ends which extend beyond the outer wall of the ball equally on diametrically opposed sides. The two axle ends are secured within retainers provided on a ring which orbits the center ball. The ring has a center track on which is contained a plurality of balls. In operation, as a cat propels the center ball, the ring is free to pivot about the axis and as the ring pivots, the balls contained in the track roll back and forth.

26 Claims, 4 Drawing Sheets

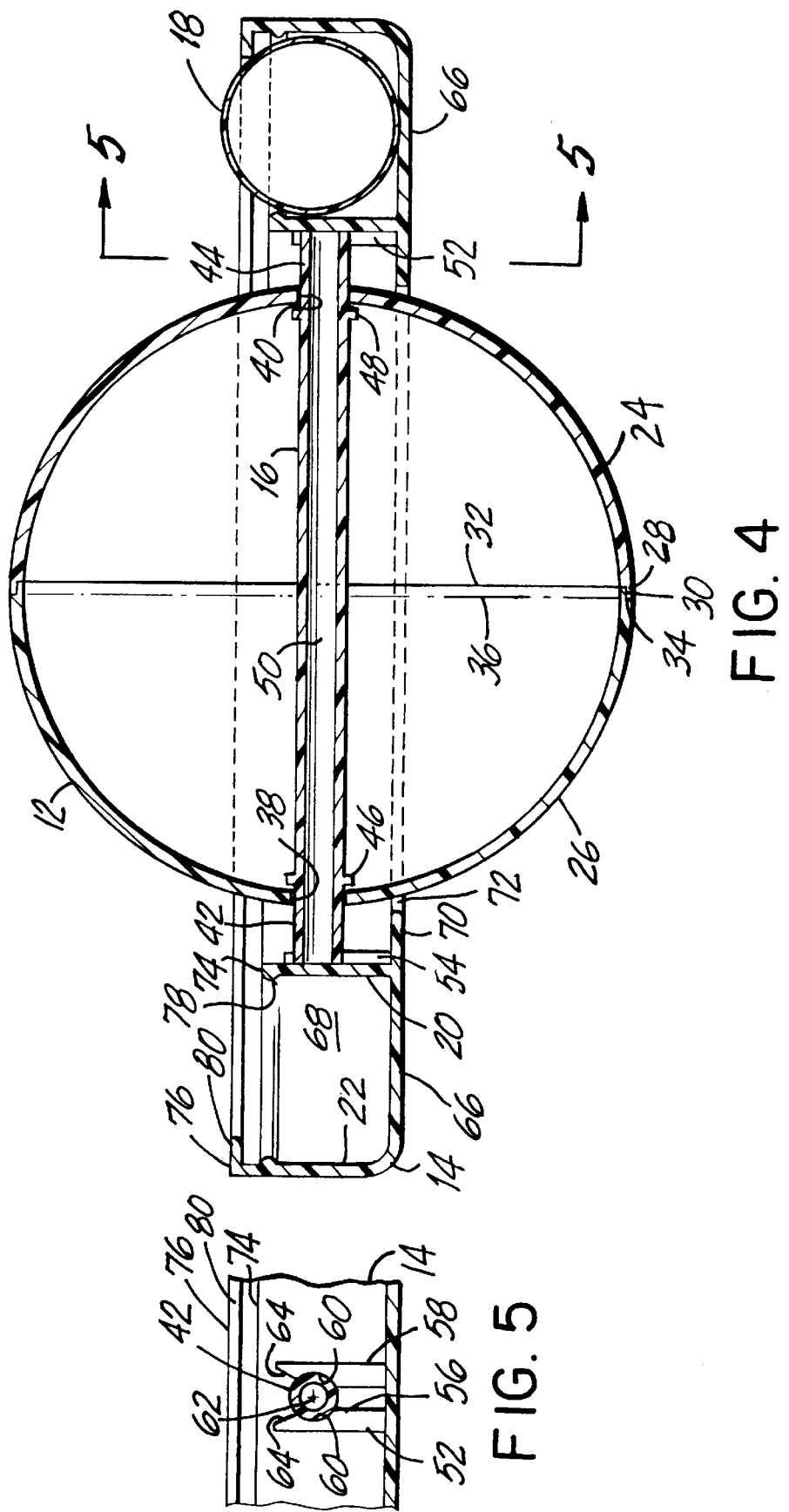

5,809,938

PET TOY

BACKGROUND OF THE INVENTION

1. Field of the Invention

The present invention relates in general to a toy which produces complex rolling and pivoting movements and, in particular, to a cat toy having a central sphere surrounded by an annular roller track within which one or more toy balls orbit the sphere.

2. Description of Prior Developments

Pet toys have been available for many years and have taken numerous forms. While simple balls have provided pets with recreation and amusement, such toys tend to be easily lost as they often roll under furniture or into inaccessible spots. However, pet toys which are not so easily lost typically are difficult to move about by a pet and fail to provide sufficient motion to maintain a pet's interest.

A need therefor continues to exist for a pet toy particularly adapted for use with cats and which is extremely easy for a pet to propel and which provides rolling motion without risk of losing the rolling elements or balls. A further need exists for such a toy which requires a relatively limited play area for full use yet which generates complex rolling and orbiting movements to maintain a pet's interest and use.

SUMMARY OF THE INVENTION

The present invention has been developed to fulfill the needs noted above and therefore has as an object the provision of a pet toy which is easily propelled and actuated by a pet to produce complex rolling and orbiting movements.

Another object of the invention is to provide a pet toy which requires a small area for use, such as within an apartment or small room, yet which allows a pet to fully use and enjoy the toy.

Another object of the invention is to provide a rolling pet toy which includes a plurality of spherical rolling elements each fully movable with respect to each other yet secured within an annular track to prevent their loss.

Still another object of the invention is to provide a pet toy particularly adapted for cats, which combines the movement of a central rolling sphere with that of an annular track pivotally mounted to the sphere and with the further movement of one or more freely rolling balls loosely retained within the track in orbit around the central sphere.

These and other objects are met in accordance with the present invention which includes a relatively large central sphere to which is pivotally mounted an annular track within which one or more orbiting toy balls are retained. The weight of the orbiting ball or balls causes the track to tip toward the ground which, in turn, causes the toy to precess in a manner similar to a top.

When the toy is at rest on a flat surface, it is maintained in a two-point metastable condition with one contact point on the sphere and the other contact point on the bottom of the annular track. By touching, pawing, swatting, pushing or otherwise imparting a small force to either the track or the central sphere, the toy balls within the track begin to orbit around the central sphere. This produces a complex motion as the track also begins to pivot about the central sphere which also is in rolling motion over the ground, floor or other support surface.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 4 is a view in section taken through section line 4—4 of FIG. 3; and

FIG. 5 is a fragmental view in section taken through section line 5—5 of FIG. 4.

In the various figures of the drawings, like reference characters designate like parts.

DETAILED DESCRIPTION OF THE PREFERRED EMBODIMENTS

Figure 1:
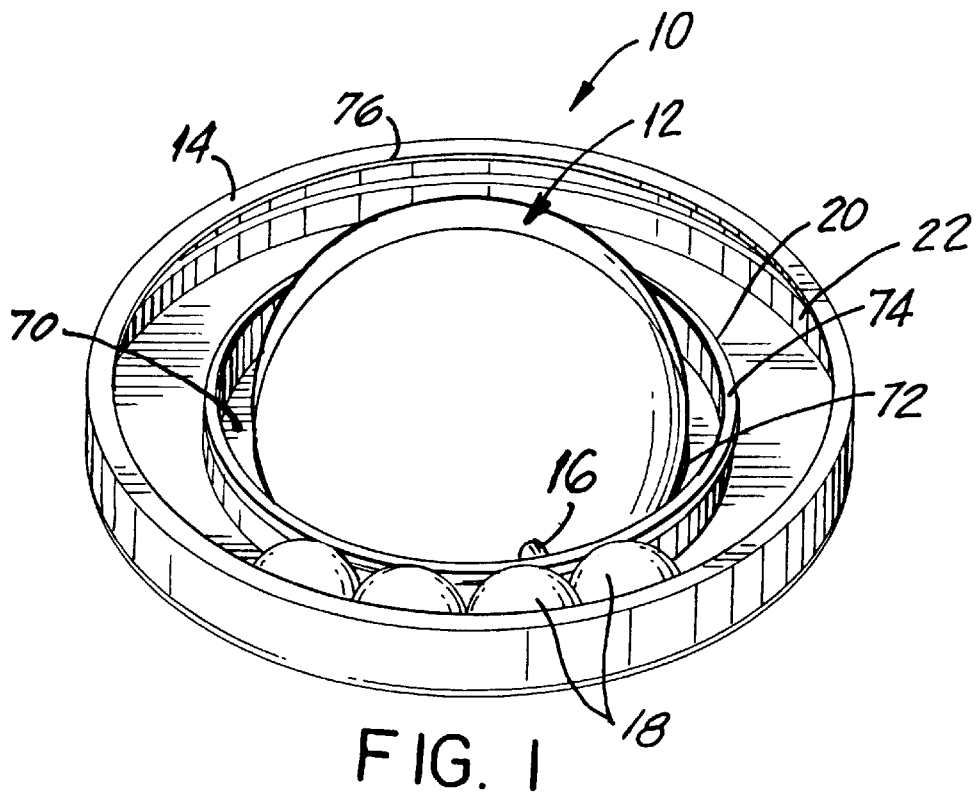
FIG. 1 is a perspective view of the present invention at rest on a flat surface and showing the top or upper surfaces of the toy.

The present invention will now be described in conjunction with the drawings beginning with FIG. 1 which depicts a pet toy 10 constructed in accordance with the invention. Pet toy 10 includes a central sphere 12 to which an annular track 14 is pivotally mounted by pivot shaft 16. Although a single hollow shaft 16 is shown, a pair of stub shafts or trunions may be used instead to provide the pivotal mounting between the central sphere 12 and the track 14.

Figure 2:
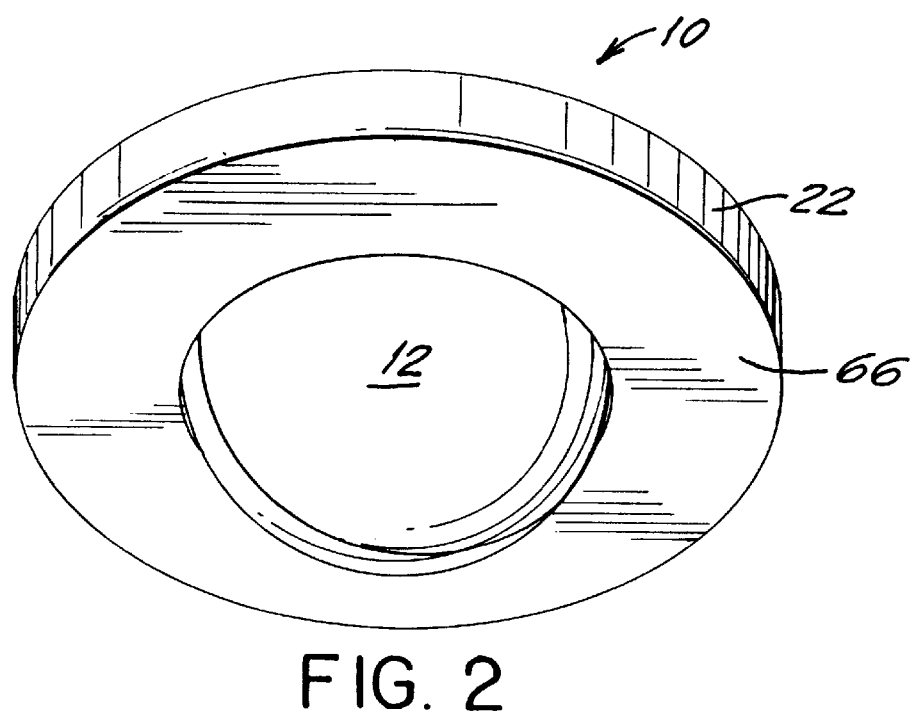
FIG. 2 is a perspective view of the present invention at rest on a flat surface and showing the bottom or lower surfaces of the toy.

One or more toy balls 18 are mounted within track 14 with a free rolling clearance fit between the inner and outer sidewalls 20,22 of the track. As seen in FIGS. 1 and 2, the weight of the balls 18 causes the track 14 to tip toward and engage the ground or other support surface upon which the toy is positioned.

Figure 3:
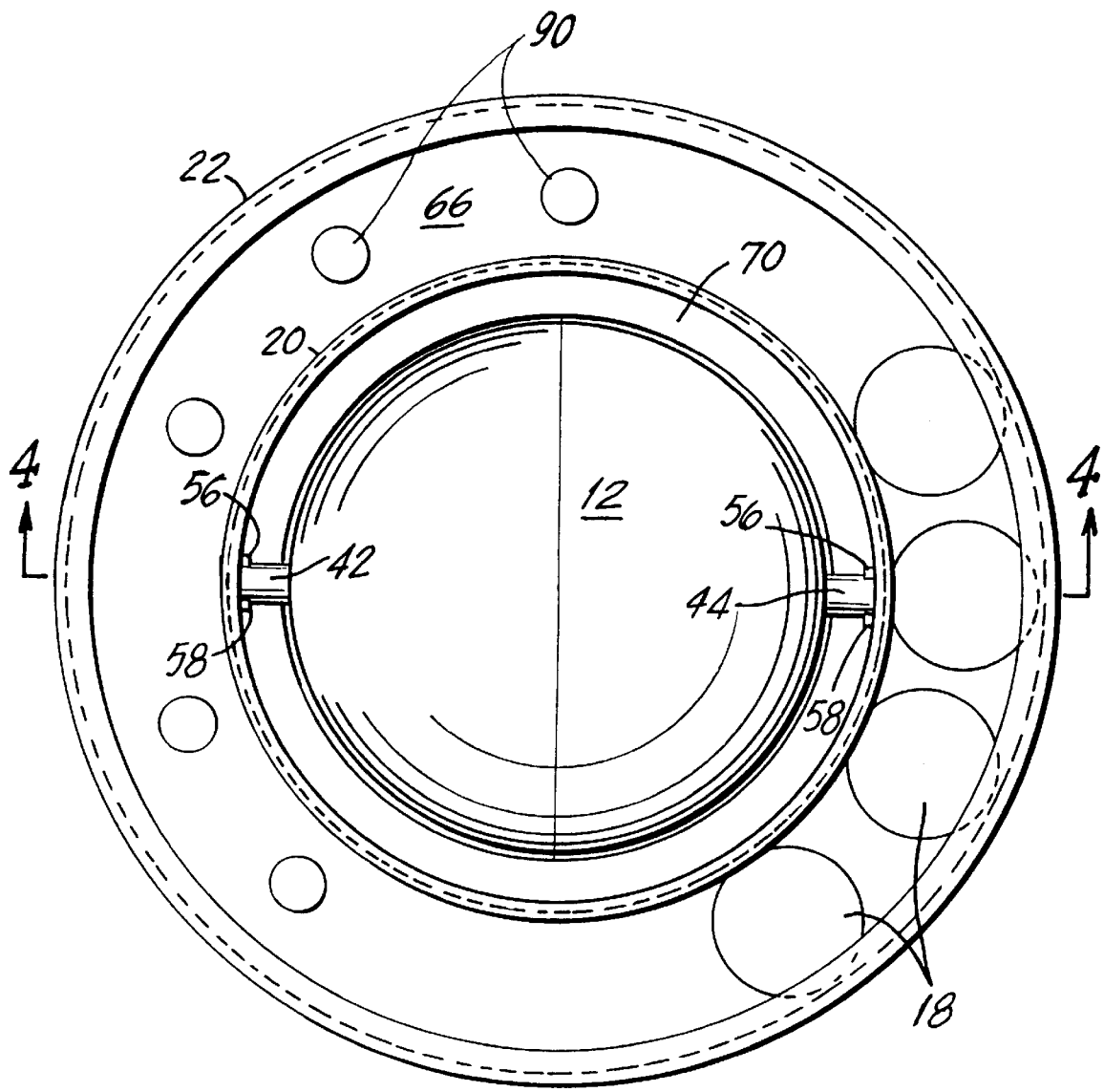
FIG. 3 is a top elevation view of the toy of FIGS. 1 and 2.

Details of the toy 10 are shown in FIGS. 3, 4 and 5, wherein the central sphere 12 is shown in FIG. 4 as a hollow plastic orb constructed from two hollow hemispheres or half shells 24,26. The hemispheres 24,26 may be joined together in any conventional fashion such as by bonding with adhesives or ultrasonic welding. Alternatively, a simple snap-fit or tongue and groove connection may be used to secure the two hemispheres together.

Such a snap-fit connection is shown in FIG. 4, wherein annular tongue 28 on hemisphere 24 is wedged into an annular groove 30 formed along and within the outer surface of the rim 32 of hemisphere 26. The rim 34 of hemisphere 24 is located along a meridian 36 of sphere 12.

Each hemisphere 24,26 is respectively formed with a central bore 38,40 through which shaft 16 is mounted with a clearance fit. The cylindrical end portions 42,44 of shaft 16 are respectively inserted through the central circular bores 38,40 prior to assembly of the hemispheres 24,26.

When the hemispheres are subsequently connected together, annular abutments or flanges 46,48 on shaft 16 substantially center the shaft 16 within the sphere 12 and prevent the shaft from sliding out of the sphere by limiting the axial freedom of the shaft within the sphere. When the shaft is subsequently mounted to the track as described below, the flanges 46,48 and the symmetrical mounting of the shaft within the sphere maintain the central sphere 12 substantially centered within or concentric with the track 14.

As further seen in FIG. 4, the axis 50 of shaft 16 is aligned coaxially along a diametral line passing through the center of sphere 12 and through the centers of circular bores 38,40. Axis 50 may be aligned perpendicular to the plane defined by circular meridian line 36 so as to pass through its center. In this manner, shaft 16 provides a rigid centered support axis about which sphere 12 may freely rotate.

The opposed cylindrical end portions 40,42 of cylindrical shaft 16 are dimensioned with a diameter which provides a secure, non-rotating fixed mounting within resilient supports 52,54 provided on track 14.

Each support 52,54, as best seen in FIG. 5, includes a pair of resilient spaced-apart molded support arms 56,58. Each support arm is formed with a section of a cylindrical bearing surface 60 each having a center 62 dimensioned to align with axis 50 of shaft 16.

The upper end of each arm 56,58 is chamfered at 64 to facilitate the insertion and snap-fit retention of the respective end portion 42,44 of shaft 16 therein. As end portions 42,44 are forced downwardly between the support arms 56,58, the support arms spread apart slightly and then resiliently snap back and clamp and anchor in fixed position the end portions 42,44 between each pair of opposed bearing surfaces 60.

In this manner, shaft 16 acts as an axle for both central sphere 12 and track 14 and as a connector which allows for relative rotation and pivotal movement between the central sphere 12 and track 14. If the track is held fixed, the sphere can rotate or pivot about shaft 16 and if the sphere is fixed the track can rotate or pivot about shaft 16 somewhat in the manner of a simple gimbal. Complex motions can be achieved by simultaneous rotation of sphere 12 about shaft 16 and rotation of track 14 about shaft 16.

Track 14 further includes a floor 66 which interconnects the inner wall 20 with outer wall 22 and thereby defines a generally U-shaped annular open top channel or raceway 68. Floor 66 may extend radially inwardly beyond inner wall 20 to provide greater strength and rigidity to the raceway by forming annular flange 70. Flange 70 defines a circular aperture 72 through which the central sphere 12 passes with a close but free rolling clearance fit.

The floor 66 of raceway 68 is preferably flat or planar, with the inner and outer walls 20,22 extending upwardly and preferably perpendicularly from the floor. Moreover, the top edges 74,76 of the inner and outer walls are preferably dimensioned to extend within planes parallel to one another, parallel to floor 66 and parallel to shaft axis 50.

In order to provide increased strength to the sidewalls as well as to capture and retain the toy balls 18 within raceway 68, inner wall 20 is formed with an annular chamfered lip 78 that projects radially outwardly, into and over raceway 68. In similar fashion, the outer wall 22 is formed with an annular chamfered lip 80 that projects radially inwardly into and over raceway 68. Lips 78,80 are preferably disposed at the same height above the floor 66 of raceway 68 although the height of the outer wall 22 may be somewhat greater than the height of the inner wall 20 to provide extra protection against the accidental escape of one of the toy balls 18 from the raceway.

As can be seen from FIG. 3, the floor 66 can be provided with a plurality of evenly spaced openings or slots 90 having a dimension generally smaller than the diameter of the balls 18 In this manner, if toy 10 is placed on a flat surface so that open top raceway 68 faces downwardly, a pet may still have access to the balls 18 via the evenly spaced openings 90 provided in floor 66. The balls 18 are supported by and prevented from escaping from open top raceway 68 by lips 78 and 80. It should be apparent that providing a plurality of openings in floor 66 permits the toy 10 to be played with when open top raceway 68 is facing upwardly or downwardly.

The radial spacing or clearance between the annular lips 78,80 is slightly less than the diameter of the toy balls 18 which, in turn, is slightly less than the spacing between the inner and outer walls 20,22. That is, the diameter of the toy balls is slightly greater than the radial spacing between the lips 78,80 and slightly less than the radial spacing between the inner and outer walls 20,22.

In this manner, the toy balls may be forced downwardly into the U-shaped raceway between the chamfered lips with a resilient snap-fit insertion. During this insertion, the resilient plastic walls 20,22 momentarily spread apart and then return to their initial position so as to capture and retain the toy balls 18 within the raceway.

As seen in FIG. 4, the toy balls 18 are dimensioned with a diameter slightly greater than the height of the outer wall 22 so as to project above its top edge 76. This provides for free access to and engagement with the toy balls by a pet as well as visual clearance which allows a pet to see the tops of the toy balls rolling erratically within the raceway 68.

As further seen in FIG. 4, the center of the toy balls, when resting on the floor 66 of raceway 68, is located above shaft axis 50 and the center of gravity of the track 14 is located below shaft axis 50. This arrangement enhances the erratic wobbling motion of the toy 10 to maintain a pet's interest.

Although a single hollow shaft 16 for defining the axis of rotation 50 has been shown a pair of stub shafts or trunions may be used instead to provide the pivotal mounting between the central sphere 12 and the track 14.

Figure 6:
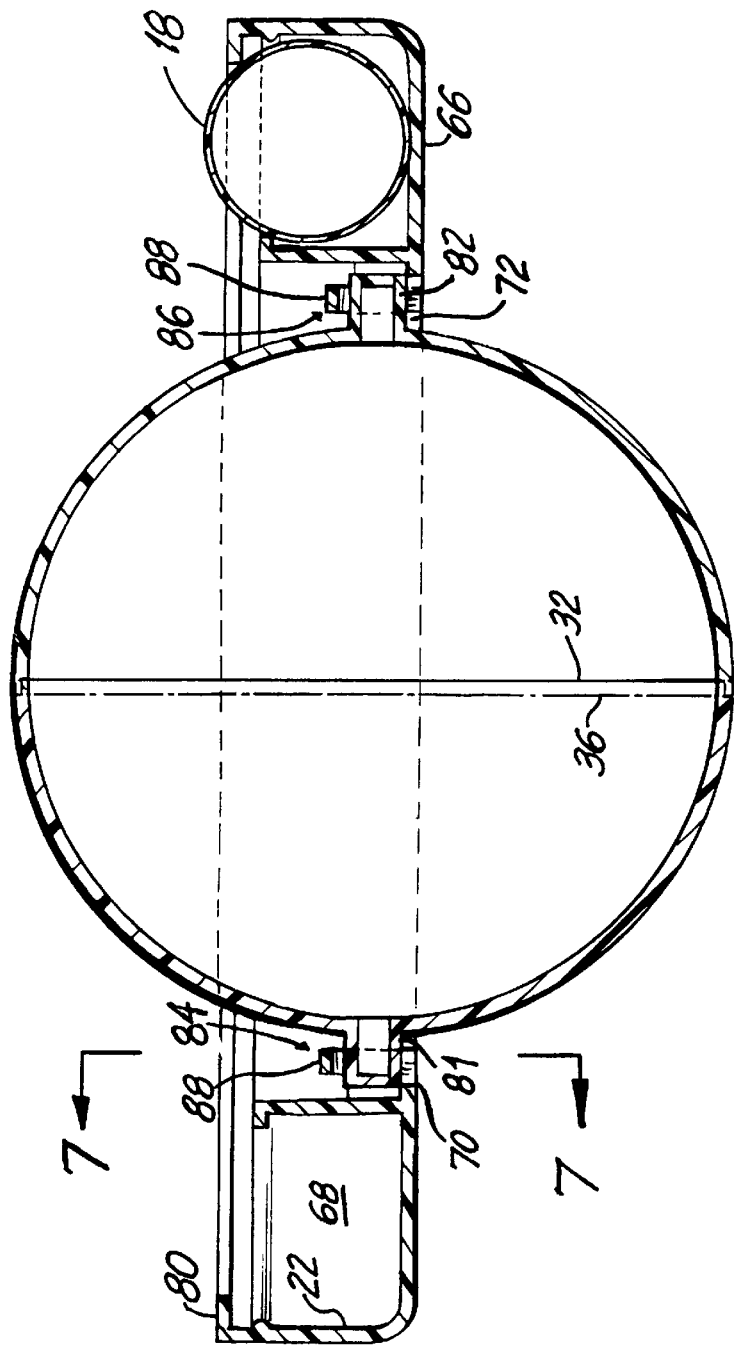
FIG. 6 is a view in section of a second embodiment of the present invention.
Figure 7:
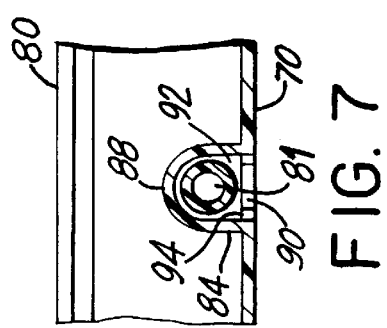
FIG. 7 is a fragmental view in section taken through section line 7—7 of FIG. 6.

A second embodiment of the invention is depicted in FIGS. 6 and 7 wherein the pet toy 10 is shown as having opposed stub shafts 81,82 to provide the pivotal mounting between the central sphere 12 and the track 14.

The opposed stub shafts 81,82 are shown as integral with and extending from an outer surface of sphere 12. As with the previous embodiment, the axis 50 is aligned coaxially along a diametral line passing through a center of sphere 12. The opposed shafts 81,82 are mounted to track 14 and secured thereto within a pair of opposed supports 84,86 provided on track 14.

Each support, as best seen in FIG. 6, includes an arched perimeter wall 88 and a base 90 comprised of a section of annular flange 70. The perimeter wall 88 and base 90 frame and define an opening 92 for each of support 84,86 through which the respective end portions of stub shafts 81,82 are inserted with a clearance fit. The opposed shafts 80,82 are dimensioned with a diameter which provides a secure yet freely rotating mounting within supports 84,86.

In this manner stub shafts 81,82 may freely rotate within opening 92 and about bearing surface 94 of base 90 which in turn provides for free rotation of sphere 12 which is integral with stub shaft 81,82. Thus in this embodiment the rotation of sphere 12 will necessarily be relative to the rotation of stub shafts 80,82.

To mount sphere 12 to track 14 one of stub shafts 81,82 is first inserted into opening 92 of one of supports 84,86. A second of stub shafts 81,82 is thereafter inserted into opening 92 of a second of supports 84,86 by slightly flexing resilient track 14 until the second of stub shafts 81,82 has been fully secured within the second of supports 84,86. In one embodiment, the diameter of the central sphere 12 may be about 5 inches, the outer diameter of the track 14 about 9⅜ inches, the height of outer wall 22 about 1⅜ inches and the diameter of the toy balls about 1½ inches. Such sizing has proved to be most appropriate for use with pets such as cats.

There has been disclosed heretofore the best embodiment of the invention presently contemplated. However, it is to be understood that various changes and modifications may be made thereto without departing from the spirit of the invention.

What is claimed is:

1. A pet toy, comprising:

a central sphere;

an annular track mechanically pivotally connected to said central sphere; and at least one ball captured and held within said track and free to orbit around said central sphere.

2. The pet toy of claim 1, further comprising a shaft mounted on said track and wherein said central sphere is mounted on said shaft.

3. The pet toy of claim 2, wherein said track further comprises a pair of opposing supports for connecting said shaft to said track.

4. The pet toy of claim 2, wherein said sphere comprises a center and wherein said shaft comprises an axis passing through said center.

5. The pet toy of claim 1, wherein said track comprises a U-shaped raceway and wherein said at least one ball is free to roll within said raceway.

6. The pet toy of claim 5, wherein said raceway comprises an open top and wherein said at least one ball extends above said open top.

7. The pet toy of claim 1, wherein said at least one ball is retained within said track with a snap-fit connection.

8. The pet toy of claim 1, wherein said track comprises a pair of opposed side walls and a floor interconnecting said side walls.

9. The pet toy of claim 8 wherein said floor has a plurality of openings to permit access to said at least one ball through said floor.

10. The pet toy of claim 8, wherein each of said side walls comprises retaining means for retaining said at least one ball within said track.

11. The pet toy of claim 10, wherein said retaining means comprises a lip overhanging said floor.

12. A pet toy, comprising:

a central sphere;

a shaft extending through and substantially centered on said sphere;

an annular track encircling said sphere and maintained substantially centered around said sphere by said shaft; and at least one ball disposed on said track and free to orbit around said central sphere.

13. The pet toy of claim 12, wherein said shaft comprises a pair of abutments disposed within said sphere for centering said shaft on said sphere.

14. The pet toy of claim 12, further comprising a pair of opposed supports provided on said track for connecting said shaft to said track.

15. The pet toy of claim 14, wherein each of said supports comprises a pair of resilient support arms.

16. The pet toy of claim 15, wherein each pair of said support arms comprises a pair of bearing surfaces for supporting said shaft and fixing said shaft to said track with a non-rotating, snap-fit connection.

17. The pet toy of claim 12, wherein said sphere comprises a pair of opposed apertures and wherein said shaft extends through said apertures with a clearance fit.

18. The pet toy of claim 12, wherein said sphere is rotatably mounted on said shaft.

19. The pet toy of claim 12, wherein said track is pivotally mounted around said sphere.

20. The pet toy of claim 12, wherein said at least one ball comprises a plurality of balls captured within said track with a snap-fit insertion.

21. A pet toy, comprising:

a central sphere;

a pair of opposed shafts extending outwardly from and substantially centered on said sphere;

an annular track encircling said sphere and maintained substantially centered around said sphere by said shafts;

at least one ball disposed on said track and free to orbit around said central sphere; and a pair of opposed supports provided on said track for connecting respectively each said pair of shafts to said track.

22. The pet toy of claim 21 wherein each of said pair of shafts extends from an outer surface of said sphere.

23. The pet toy of claim 21 wherein each of said supports comprises a perimeter wall joined to a base for defining an opening.

24. The pet toy of claim 23, wherein a portion of said shafts is supported by said base and extends through said openings with a clearance fit.

25. The pet toy of claim 21, wherein said shafts may freely rotate within said supports.

26. The pet toy of claim 21, wherein said at least one ball comprises a plurality of balls captured within said track with a snap-fit insertion.

* * * * *